(12) United States Patent
Morovic et al.

(10) Patent No.: US 10,893,173 B2
(45) Date of Patent: Jan. 12, 2021

(54) COLOR SPACE VALUES CORRESPONDING TO CLASSIFICATION IDENTIFIERS

(71) Applicant: HEWLETT-PACKARD DEVELOPMENT COMPANY, L.P., Spring, TX (US)

(72) Inventors: Peter Morovic, Sant Cugat del Valles (ES); Jan Morovic, London (GB); Joan Vidal Fortia, Sant Cugat del Valles (ES); Lluis Abello Rosello, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/338,181

(22) PCT Filed: Jan. 30, 2017

(86) PCT No.: PCT/US2017/015652
§ 371 (c)(1),
(2) Date: Mar. 29, 2019

(87) PCT Pub. No.: WO2018/140060
PCT Pub. Date: Aug. 2, 2018

(65) Prior Publication Data
US 2020/0028992 A1    Jan. 23, 2020

(51) Int. Cl.
*H04N 1/60* (2006.01)
*H04N 1/52* (2006.01)
(Continued)

(52) U.S. Cl.
CPC ....... *H04N 1/6061* (2013.01); *H04N 1/00005* (2013.01); *H04N 1/00015* (2013.01);
(Continued)

(58) Field of Classification Search
CPC .... H04N 1/40–4097; H04N 1/52; H04N 1/56; H04N 1/58; H04N 1/60–6097; G06K 15/1872; G06K 15/1878; G06K 15/1881
See application file for complete search history.

(56) References Cited

U.S. PATENT DOCUMENTS 5,134,667 A    7/1992  Suzuki
5,166,810 A    11/1992 Sorimachi et al.
(Continued)

FOREIGN PATENT DOCUMENTS

WO    WO-2015/161895 A1    10/2015

OTHER PUBLICATIONS

Babaei, V. et al., Juxtaposed Color Halftoning Relying on Discrete Lines, Feb. 2013, <http://lspwww.epfl.ch/publications/colour/jchrodl_13.pdf>.
(Continued)

*Primary Examiner* — Scott A Rogers
(74) *Attorney, Agent, or Firm* — HP Inc. Patent Department (57) ABSTRACT

In an example, an image processing system may include an identification engine, a map engine, and a control engine. In that example, the identification engine may identify a color mapping resource in response to a classification identifier corresponding to image data, the map engine may map the image data with the color mapping resource having color space clause corresponding to the classification identifier, and the control engine may generate control data for operating a print apparatus to print based on the color mapping resource.

21 Claims, 5 Drawing Sheets

(51) Int. Cl.
*H04N 1/00* (2006.01)
*H04N 1/58* (2006.01)

(52) U.S. Cl.
CPC ..... *H04N 1/00023* (2013.01); *H04N 1/00047* (2013.01); *H04N 1/00068* (2013.01); *H04N 1/00082* (2013.01); *H04N 1/52* (2013.01); *H04N 1/58* (2013.01); *H04N 1/6019* (2013.01)

(56) References Cited

U.S. PATENT DOCUMENTS

| | | | |
|---|---|---|---|
| 7,079,287 | B1 | 7/2006 | Ng et al. |
| 7,532,363 | B2 | 5/2009 | Curry et al. |
| 8,228,518 | B2 * | 7/2012 | Togami ................ H04N 1/6072 358/1.13 |
| 8,254,002 | B2 * | 8/2012 | Nakahara ............. H04N 1/4056 358/3.06 |
| 9,057,645 | B2 | 6/2015 | Holub |
| 2001/0019427 | A1 * | 9/2001 | Komatsu ............. H04N 1/6058 358/1.18 |
| 2004/0001229 | A1 * | 1/2004 | Hanyu ............... H04N 1/40062 358/2.1 |
| 2004/0109181 | A1 * | 6/2004 | Suzuki ................ H04N 1/4072 358/1.9 |
| 2006/0072135 | A1 * | 4/2006 | Umezawa ........... H04N 1/0044 358/1.9 |
| 2006/0215194 | A1 * | 9/2006 | Gotoh ..................... H04N 1/60 358/1.9 |
| 2007/0091340 | A1 * | 4/2007 | Miyaki ................. H04N 1/603 358/1.9 |
| 2007/0153020 | A1 * | 7/2007 | Inoue .................. H04N 1/6019 345/591 |
| 2011/0255779 | A1 * | 10/2011 | Sloan ...................... H04N 1/60 382/167 |
| 2014/0225953 | A1 * | 8/2014 | Robinson ............ H04N 1/6027 347/15 |
| 2014/0368846 | A1 | 12/2014 | Hadas et al. |
| 2019/0238723 | A1 * | 8/2019 | Morovic ................. H04N 1/60 |

OTHER PUBLICATIONS

Chung K-L et al., Inverse Halftoning Algorithm Using Edge-based Lookup Table Approach, Oct. 2005, < http://www.ncbi.nlm.nih.gov/pubmed/16238063 >.

* cited by examiner

602 DETERMINE A NUMBER OF PRINT BARS TO USE BASED ON A CLASSIFICATION IDENTIFIER

604 SELECT A LOOK-UP TABLE OF COLOR SPACE VALUES BASED ON THE CLASSIFICATION IDENTIFIER

606 PERFORM A COLOR MAPPING PROCESS USING THE LOOK-UP TABLE CORRESPONDING TO THE CLASSIFICATION IDENTIFIER

608 GENERATE CONTROL DATA FOR PRINTING A HALFTONE IMAGE BASED ON A RESULT OF THE COLOR MAPPING PROCESS PERFORMED ON THE SET OF IMAGE DATA USING THE LOOK-UP TABLE

*FIG. 6*

702 IDENTIFY A FIRST CLASSIFICATION IDENTIFIER ASSOCIATED WITH A FIRST SET OF IMAGE DATA AND A SECOND CLASSIFICATION IDENTIFIER ASSOCIATED WITH A SECOND SET OF IMAGE DATA

704 DETERMINE A NUMBER OF PRINT BARS TO USE BASED ON THE FIRST CLASSIFICATION IDENTIFIER AND THE SECOND CLASSIFICATION IDENTIFIER

706 SELECT A FIRST LUT OF COLOR SPACE VALUES BASED ON THE FIRST CLASSIFICATION IDENTIFIER AND A SECOND LUT OF COLOR SPACE VALUES BASED ON THE SECOND CLASSIFICATION IDENTIFIER

708 RETRIEVE A FIRST NPAC FROM THE FIRST LUT AND A SECOND NPAC FROM THE SECOND LUT

710 PERFORM A COLOR MAPPING PROCESS USING THE RETRIEVED NPACS FOR THE CORRESPONDING IMAGE DATA SETS

712 GENERATE A HALFTONE IMAGE USING A FIRST HALFTONE MATRIX CORRESPONDING TO THE FIRST CLASSIFICATION IDENTIFIER AND A SECOND HALFTONE MATRIX CORRESPONDING TO THE SECOND CLASSIFICATION IDENTIFIER

COLOR SPACE VALUES CORRESPONDING TO CLASSIFICATION IDENTIFIERS

BACKGROUND

Images are processed for use with computing machines, such as a print apparatus. A print apparatus, for example, may use control data based on processed image data to reproduce a physical representation of an image by operating a print fluid ejection system according to the control data. Image processing may include color calibration. An image may be processed in a print apparatus pipeline or processed offline in separate compute device, such as a print server.

DETAILED DESCRIPTION

In the following description and figures, some example implementations of print apparatus, image processing systems, and/or methods of color mapping are described. In examples described herein, a "print apparatus" may be a device to print content on a physical medium (e.g., paper or a layer of powder-based build material, etc.) with a print fluid (e.g., ink or toner). For example, the print apparatus may be a wide-format print apparatus that prints latex-based print fluid on a print medium, such as a print medium that is size A2 or larger. In the case of printing on a layer of powder-based build material, the print apparatus may utilize the deposition of print fluids in a layer-wise additive manufacturing process. A print apparatus may utilize suitable print consumables, such as ink, toner, fluids or powders, or other raw materials for printing. In some examples, a print apparatus may be a three-dimensional (3D) print apparatus. An example of print fluid is a water-based latex ink ejectable from a print head, such as a piezoelectric print head or a thermal inkjet print head. Other examples of print fluid may include dye-based color inks, pigment-based inks, solvents, gloss enhancers, fixer agents, and the like.

Certain examples described herein relate to color calibration of a print system. For example, color calibration may be used to adjust the color response of the print system to more accurately correspond to a desired color to be printed. Color calibration may be used to calibrate a color mapping process by which a first representation of a given color is mapped to a second representation of the same color. The concept of "color" can be represented in a large variety of ways, such as in relation to a power or intensity spectrum of electromagnetic radiation across a range of visible wavelengths or a color model is used to represent a color at a lower dimensionality. A "color" may be said to be a category that is used to denote similar visual perceptions where two colors are said to be similar if they produce a similar effect on a group of one or more people. These categories can then be modelled using a lower number of variables. In an example printing pipeline, individual inks may be calibrated separately so that printed colors are similar to or match desired colors.

A color model may define a color space (i.e., a multi-dimensional space with dimensions of the space representing variables within the color model and a point in the multi-dimensional space representing a color value. For example, in a red, green, blue (RGB) color space, an additive color model defines three variables representing different quantities of red, green and blue light. Another color space may include a cyan, magenta, yellow and black (CMYK) color space, in which four variables are used in a subtractive color model to represent different quantities of colorant or ink (e.g., for a print system and an image with a range of different colors can be printed by overprinting images for each of the colorants or inks). Yet other examples include: the International Commission on Illumination (CIE) 1931 XYZ color space, in which three variables ('X', 'Y' and 'Z' or tristimulus values) are used to model a color; the CIE 1976 (L*, a*, b*—CIELAB or 'LAB') color space, in which three variables represent lightness ('L') and opposing color dimensions ('a' and 'b'); and the Yu'v' color space, in which three variables represent the luminance ('Y') and two chrominance dimensions (u' and v').

Other spaces include area coverage spaces, such as the Neugebauer Primary area coverage (NPAC) space. NPAC space may be used as a print control space that controls a color output of an imaging device. An NPAC vector in the NPAC space represents a statistical distribution of one or more Neugebauer Primary (NP) vectors over an area of a halftone. An NP may include one of $N^k$ combinations of k inks within the print system, such as in the context of multi-level printers where print heads are able to deposit N drop levels (e.g., via multiple print passes or print-bars). For example, in a simple binary (bi-level, i.e. two drop state: "drop" or "no drop") printer, an NP is one of $2^k$ combinations of k inks within the print system. In an example of a print apparatus that uses CMY inks, there can be eight NPs: C, M, Y, C+M, C+Y, M+Y, C+M+Y, and W (white or blank indicating an absence of ink). An NP may comprise an overprint of available inks, such as a drop of magenta on a drop of cyan (for a bi-level printer) in a common addressable print area (e.g. a printable "pixel").

An NPAC space provides a large number of metamers. Metamerism is the existence of a multitude of combinations of reflectance and emission properties that result in the same perceived color for a fixed illuminant and observer.

Each NPAC vector may define the probability distribution for one or more colorant or ink combinations for each pixel in a halftone (e.g., a likelihood that a particular colorant or ink combination is to be placed at each pixel location in the halftone). In this manner, a given NPAC vector defines a set of halftone parameters that can be used in the halftoning process to map a color to a NP vector (e.g., map a color to multiple NP vectors) to be statistically distributed over the plurality of pixels for a halftone. Moreover, the statistical distribution of NPs to pixels in the halftone serves to control the colorimetry and other print characteristics of the halftone. Spatial distribution of the NPs according to the probability distribution specified in the NPAC vector may be performed using any suitable halftoning methods, such as matrix-selector-based Parallel Random Area Weighted Area Coverage Selection (PARAWACS) techniques and techniques based on error diffusion. An example of a print system that uses area coverage representations or halftone generation is a Halftone Area Neugebauer Separation (HANS) pipeline.

In general, color separations may use many different NPs at different probabilities (i.e., coverages) to represent a given color. Large regions or smoothly changing color transitions (where such NP variety may help grain or redundancy) may benefit from the use of many different NPs. However, other detail features, such as for edges and lines, complex NPs (e.g., the use of many different NPs) may result in decreased integrity to the source image.

Various examples described below relate to color calibration for printing based on NPACs, for example using a HANS pipeline. The color calibration may involve adjustment to the color space values based on a classification of the image data, e.g., an area of fine detail (such as lines or text) or uniform color area.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus.

Figures 1, 2:
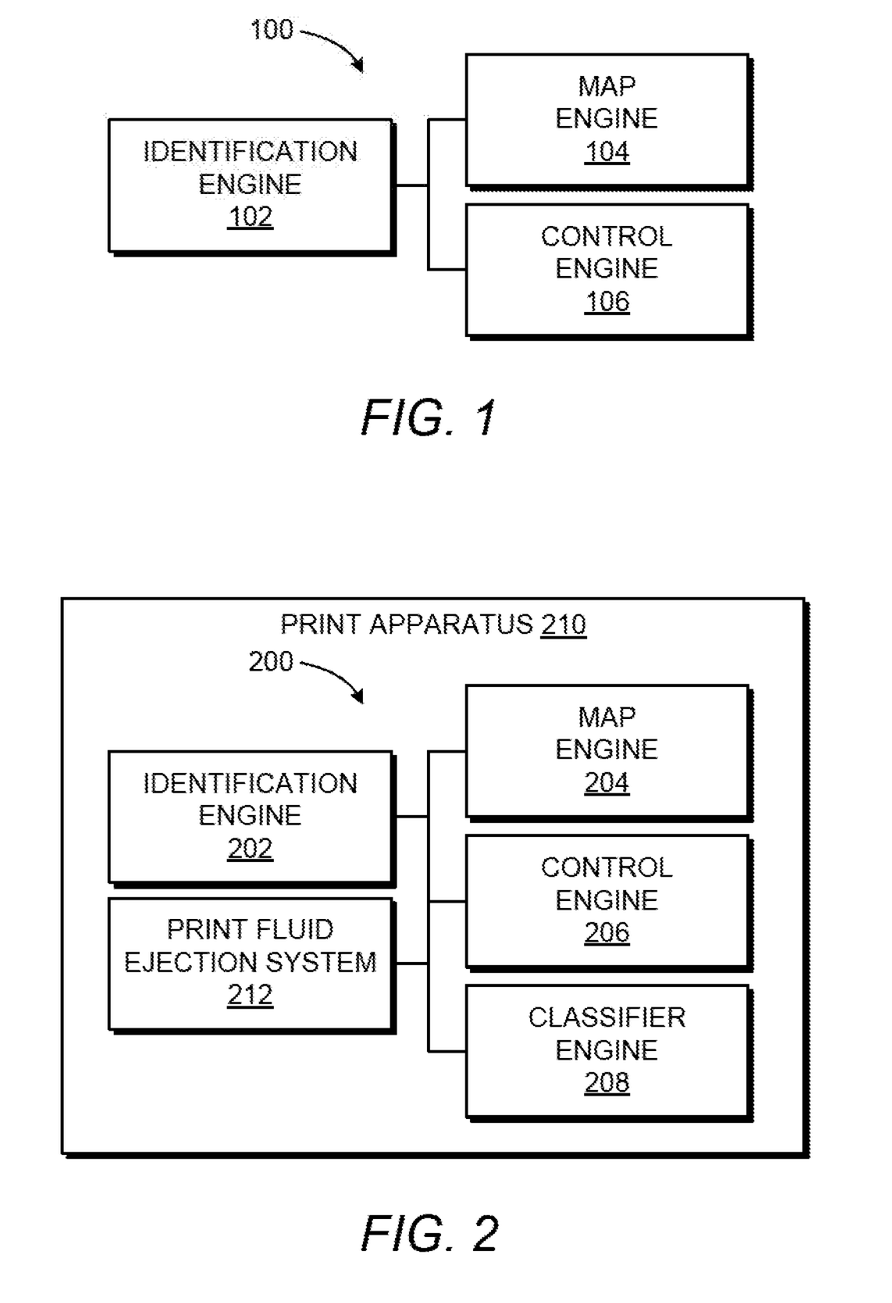
FIGS. 1-4 are block diagrams depicting example image processing systems.

FIGS. 1-4 are block diagrams depicting example image processing systems 100, 200, 300, and 400. Referring to FIG. 1, the example image processing system 100 of FIG. 1 generally includes an identification engine 102, a map engine 104, and a control engine 106. In general, map engine 104 performs a color mapping operation using a resource identified by the identification engine 102 using classification of image data and the results of the color mapping operation are used by the control engine 106 to produce control data to operate a print apparatus based on the image classification.

The identification engine 102 represents any circuitry or combination of circuitry and executable instructions to an identification engine to identify a color mapping resource in response to a classification identifier corresponding to image data. For example, the identification engine 102 may be a combination of circuitry and executable instructions, that when executed, identify a set of resources to use based on classification identifiers corresponding to regions of image data (e.g., a resource for each region or each classification applied to the regions of image data). With availability of regional classifications of the image data, the identification engine 102 is able to determine a resource to use in the color mapping operations, such as a color separation process. For example, a subset of a canonical set of resources may be used, where the subset of resources are modified (i.e., different with respect to the canonical set) to generate mapping results that preserve integrity for regions with that regional classification, such as resources representing simplified coverages for edges and lines. Indeed, the identification engine 102 may identify a coverage attribute threshold that corresponds to the classification identifiers associated with the regions, and identify a coverage attribute threshold that is different from a default coverage size threshold for any given region that is classified, for example. With the appropriate resources selected, the color mapping operation performed by the image processing system 100 may perform the color mapping operations with better integrity to the source data, for example.

As used herein, a "resource" may include any set of reference data or functions useable with the color mapping operations. Example resources include a look-up table (LUT) of color values based on coverage size, a color separation function, a halftone matrix, a halftone processing function, the like, or a combination thereof. A "coverage attribute threshold," as used herein, represents a threshold amount of a characteristic of coverage of a color in a color space of an area. Example coverage attribute thresholds include a coverage size threshold and a coverage complexity threshold. As used herein, a "coverage size threshold" refers to the amount (e.g., a proportion) of coverage of a color in a pixel area. Coverages may be expressed as a probability or proportion over a nominal area, such a percentage of the area having the particular color combination. For example, a green area may be produced by a printing 50% of the pixels of an area with cyan and 50% of the pixels of the area with yellow, where an area with 50% coverage of cyan and 50% coverage of yellow produces a green tone. In that example, a coverage size threshold of 30% would not limit (e.g., eliminate) either the cyan or yellow coverages because the coverages of the colors are above the threshold amount. In this manner, a coverage size and/or a coverage size threshold may be represented in any appropriate form capable of representing an amount of coverage of an area, such as a percentage, a decimal, or any other number or character string associable with coverage amount. As used herein, a "coverage complexity threshold" refers to a number of colors in a coverage area, such as a number of NPs per NPAC. For example, a coverage complexity may be reduced to a threshold number by removing color combinations from the NPAC until a desired number of color combinations is achieved. In this manner, a coverage complexity threshold may be represented in any appropriate form representing a number of different color combinations in an area. Example colors include base colors of a colors space (such as cyan, magenta, yellow, and black in a CMYK color space) as well as variations of those colors (such as CM and MY in the example CMYK color space). White coverage and/or blank coverages are also possible selections for representing a coverage area. For example, a CMYK NPAC may include the following percentages of colors: C at 3.5%, M at 7%, CM at 12%, Y at 43%, MY at 23.5%, and blank at 10%. The thresholds discussed herein can be used for relative modifications to color spaces. For example, a coverage size threshold of 4% would remove the C from the previous example and a coverage complexity threshold of 4 would remove the C and M, leaving the area coverage represented by the top four color combinations: Y, MY, CM, and blank. In such examples, the remaining color coverages may be rescaled to compensate for any modifications.

The map engine 104 represents any circuitry or combination of circuitry and executable instructions to map the image data with the color mapping resource having color space values corresponding to the classification identifier. For example, the map engine 104 may be a combination of circuitry and executable instructions that, when executed, perform color separation operations using a LUT of color spaces corresponding to the classification identifier, as selected by the identification engine 102. The map engine 104 may use a resource directly with the color mapping operations or may use the resource to produce a modified version of the resource to use with the color mapping operations. For example, the map engine 104 may select a LUT from a number of predetermined LUTs, such as selecting a LUT associated with coverage attribute threshold and using an identified coverage attribute threshold that is different from a default coverage attribute threshold. For another example, the map engine 104 may retrieve a general LUT (e.g., canonical LUT) and based on the retrieved resource, determine a modification for the general LUT and compute a modified version of the general LUT, such as retrieving data that the table should have a particular coverage attribute threshold, and modifying a general LUT to remove any color space values beyond the coverage attribute threshold identified by the identification engine 102. Modified versions of resources may include adding or removing NPACs, such as by increasing or decreasing the coverages of NPs in comparison to a canonical LUT.

The map engine 104 may utilize the feature classifications and NPACs of the LUTs corresponding to the feature classifications to individualize the color mapping process for each image region based on the feature classification associated with it. In an example, a minimum number of NPs per node may be determined by setting every NP to have as large an area coverage as possible via removing area coverages that correspond to coverages below a threshold and distributing the coverages to NPs that remain after the cut off. In that manner, the LUT ends up being less granular, for example, and may be used to preserve detail features. In another example, a print apparatus with multiple print bars may elect to print regions classified as details with a single print bar with a modified color separation based on an area coverage threshold so that if an RGB node in a pipeline was [0 0 0: w:0.8, KKK:0.2]—meaning 3 drops of K are printed at 40% coverage for the black node, in the dynamically masked case (where instead of CMYK we have 12 channels, e.g. CMYKEFGHOPQR, whereby CMYK is the first bar, EFGH is CMYK for the second bar and OPQR is CMYK for the third bar) this would translate to [0 0 0: w:0.8, KHR:0.2] and the mask would be modified to [0 0 0:w:0.4, K:0.6] (of H or R at 60%) during the color mapping process when printing with a single print bar (and the multiple print bar alternative would be [0 0 0: w:0.4, K:0.2, H:0.2, R:0.2]). In that example, the drop placement error due to multi-bar alignment may be reduced in the detail regions. The opposite may also be true; for example, a non-detail region may be enhanced by adding noise into the color mapping process by utilizing multiple print bars derived from a single print bar mapping alternative.

The control engine 106 represents any circuitry or combination of circuitry and executable instructions to generate control data for operating a print apparatus to print based on the color mapping resource. For example, the control engine 106 may be a combination of circuitry and executable instructions, that when executed, generate an output image halftone as a result of the color mapping operations for a print apparatus able. Other control data particular to the implementation of the processing pipeline of the print apparatus may be used. For another example, the control engine 106 may combine the color mapping operations performed on the regions of the image data that have different classifications. For yet another example, the control engine 106 may generate control data by combining a first set of halftone image data processed using a first LUT with image data corresponding to identified first coverage attribute threshold and a second set of halftone image data processed using a second LUT corresponding to a second coverage attribute threshold that is different from the first coverage attribute threshold. The result produced by the control data of the control engine 106 may be a halftone that is homogenous when using resources that originated from similar resources, such as a canonical LUT for general or default processing and a modified LUT from the canonical LUT using sufficiently high area coverages (or sufficiently low area coverages depending on the desired mapping effect) that preserves the regions associated with feature classifications by processing them with the modified resources.

Referring to FIG. 2, the print system 200 may be implemented on a print apparatus 210 that includes a print fluid ejection system 212 to deposit colorants according to the control data onto a print medium. The print system 200 includes an identification engine 202, a map engine 204, and a control engine 206 that are the same as the identification engine 102, the map engine 104, and the control engine 106 of FIG. 1 and may include particular implementations specific to utilize the print fluid ejection system 212 of the print apparatus 210 and the classifier engine 210.

The classifier engine 208 represents any circuitry or combination of circuitry and executable instructions to determine the classification identifier based on a characteristic of the image data. For example, the classification identifiers may be included in raster image processing (RIP) data as a result of processing the image source by a RIP processor of the classifier engine 208. The classifier engine 208 may utilize image processing techniques for classification of image regions, such as edge detection or gradient filter computations, which may result in a feature map or equivalent by distinguishing brightness as a sharper gradient, for example.

Figure 3:
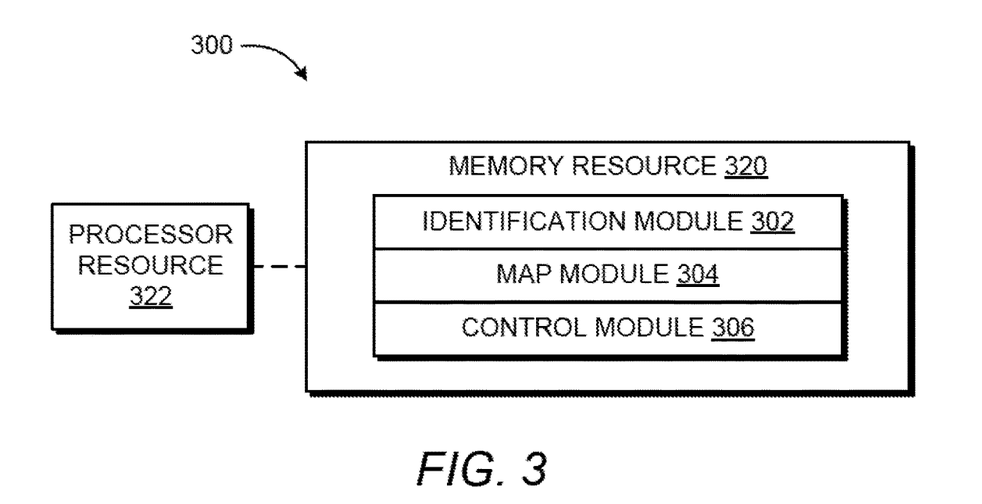
Figure 4:
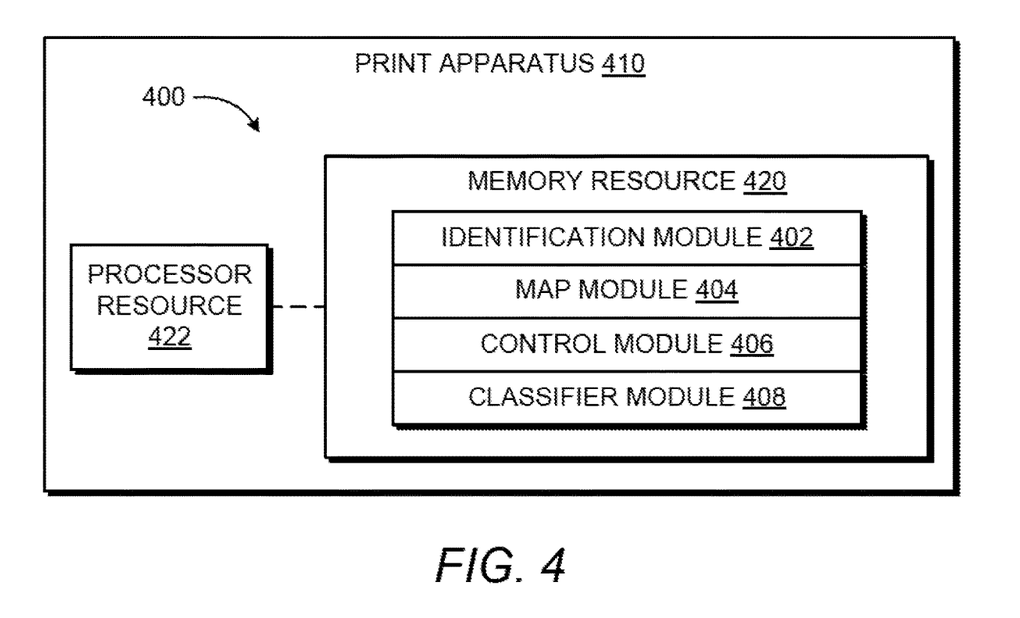

FIGS. 3 and 4 depict the example systems 300 and 400 may comprise a memory resource operatively coupled to a processor resource. Referring to FIG. 3, the memory resource 320 may contain a set of instructions that are executable by the processor resource 322. The set of instructions are operable to cause the processor resource 322 to perform operations of the system 300 when the set of instructions are executed by the processor resource 322. The set of instructions stored on the memory resource 320 may be represented as an identification module 302, a map module 304, and a control module 306. The identification module 302, the map module 304, and the control module 306 represent program instructions that when executed function as the identification engine 102, the map engine 104, and the control engine 106 of FIG. 1, respectively. The processor resource 322 may carry out a set of instructions to execute the modules 302, 304, 306 and/or any other appropriate operations among and/or associated with the modules of the system 300. For example, the processor resource 322 may carry out a set of instructions to perform a color mapping process using color space values derived form a modified color space based on a classification identifier corresponding to input image data where the modified color space includes area coverages that are increased (e.g., on average) when the classification identifier corresponds to a first feature (e.g., a detail region) or decreased (e.g., on average) when the classification identifier corresponds to a second feature (e.g., a non-detail region). For another example, the processor resource 322 may carry out a set of instructions to identify a threshold coverage attribute associated with a classification identifier and modify a LUT of color space values to include modified color space values by either removing coverages in order of coverage size until a threshold number of NPs is achieved (e.g., remove NPs with smallest area coverages until the desired maximum number of NPs is obtained) and resealing any remaining coverage areas or adding noise to the color space values above the coverage attribute threshold and resealing any remaining coverage areas. For yet another example, the processor resource 322 may carry out a set of instructions to remove NPs from an NPAC retrieved from a LUT by omission of NPs with a color area coverage less than the coverage size threshold from the LUT entry or elimination of NPs with a relatively smallest area coverage until a coverage complexity threshold is achieved, maintain a coverage size of a blank NP with respect to unmodified color space values, and rescale non-blank NPs to increase coverage in response to the removal of NPs. For yet another example, the processor resource 322 may carry out a set of instructions to select a halftone resource based on the classification identifier, produce an output image halftone using the selected halftone resource, and generate control data for a print apparatus from the output image halftone.

Although these particular modules and various other modules are illustrated and discussed in relation to FIG. 3 and other example implementations, other combinations or sub-combinations of modules may be included within other implementations. Said differently, although the modules illustrated in FIG. 3 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 4 depicts yet another example of how functionality may be organized into modules as an image processing system 400 useable as part of a print apparatus 410, including a classifier module 408 that represents program instructions that when executed function as the classifier engine 208 of FIG. 2.

A processor resource is any appropriate circuitry capable of processing (e.g., computing) instructions, such as one or multiple processing elements capable of retrieving instructions from a memory resource and executing those instructions. For example, the processor resource 322 may be a central processing unit (CPU) that enables color mapping based on classification identifier by fetching, decoding, and executing modules 302, 304, and 306. For another example, the processor resource 422 may be a central processing unit (CPU) that enables color mapping based on classification identifier by fetching, decoding, and executing modules 402, 404, 406, and 408. Example processor resources include at least one CPU, a semiconductor-based microprocessor, a programmable logic device (PLD), and the like, Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

A memory resource represents a medium to store data utilized and/or produced by the system 300 or 400. The medium is any non-transitory medium or combination of non-transitory media able to electronically store data, such as modules of the systems 300, 400 and/or data used by the systems 300, 400. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. The memory resources 320 and 420 may be said to store program instructions that when executed by the processor resources 322 or 422, respectively, cause the processor resources 322 or 422 to implement functionality of the system 300 of FIG. 3 and system 400 of FIG. 4, respectively. A memory resource may be integrated in the same device as a processor resource or it may be separate but accessible to that device and the processor resource. The memory resource may be distributed across devices.

In the discussion herein, the engines 102, 104, 106, 202, 204, 206, and 208 of FIGS. 1-2 and the modules 302, 304, 306, 402, 404, 406, and 408 of FIGS. 3-4 have been described as circuitry or a combination of circuitry and executable instructions. Such components may be implemented in a number of fashions. Looking at FIG. 3, the executable instructions may be processor-executable instructions, such as program instructions, stored on a memory resource, such as memory resource 320, which is a tangible, non-transitory computer-readable storage medium, and the circuitry may be electronic circuitry, such as processor resource 322, for executing those instructions. The instructions residing on the memory resource may comprise any set of instructions to be executed directly (such as machine code) or indirectly (such as a script) by the processor resource.

In some examples, the system 400 may include executable instructions integrated on a memory resource coupled directly to a processor resource on a circuit board of a device, such as a print apparatus 410. In some examples, the system 300 may include executable instructions that may be part of an installation package that when installed may be executed by the processor resource 322 to perform operations of the system 300, such as methods described with regards to FIGS. 5-8. In that example, the memory resource 320 may be a portable medium such as a compact disc, a digital video disc, a flash drive, or memory maintained by a computer device, such as a server, from which the installation package may be downloaded and installed. In another example, the executable instructions may be part of an application or applications already installed. A memory resource may be a non-volatile memory resource such as read only memory (ROM), a volatile memory resource such as random access memory (RAM), a storage device, or a combination thereof. Example forms of a memory resource include static RAM (SRAM), dynamic RAM (DRAM), electrically erasable programmable ROM (EEPROM), flash memory, or the like. The memory resource may include integrated memory such as a hard drive (HD), a solid state drive (SSD), or an optical drive.

As mentioned above, the engines 102, 104, 106, 202, 204, 206, and 208 may be integrated via circuitry or as installed instructions into a memory resource of the compute device, such as a print apparatus or a service device (e.g., a web server). A service device represents generally any compute device to respond to a network request received from a user device (e.g., a print apparatus), whether virtual or real. For example, the service device may operate a combination of circuitry and executable instructions to provide a network packet in response to a request for a page or functionality of an application. A user device represents generally any compute devices to communicate a network request and receive and/or process the corresponding responses. The compute devices may be located on separate networks 330 or part of the same network 330. For example, the compute devices may generally be coupled by a link, where a link generally represents one or a combination of a cable, wireless connection, fiber optic connection, or remote connections via a telecommunications link, an infrared link, a radio frequency link, or any other connectors of systems that provide electronic communication including communication with, at least in part, intranet, the Internet, or a combination of both (e.g., and may use intermediate proxies, routers, switches, load balancers, and the like). Any appropriate combination of the system 300 and compute devices may be a virtual instance of a resource of a virtual shared pool of resources. The engines and/or modules of the system 300 herein may reside and/or execute "on the cloud" (e.g., reside and/or execute on a virtual shared pool of resources).

Referring to FIGS. 1-4, the engines 102, 104, 106, 202, 204, 206, and 208 of FIGS. 1-2 and/or the modules 302, 304, 306, 402, 404, 406, and 408 of FIGS. 3-4 may be distributed across devices. The engine and/or modules may complete or assist completion of operations performed in describing another engine and/or module. For example, the map engine 104 of FIG. 1 may request, complete, or perform the methods or operations described with the map engine 204 of FIG. 2 as well as the identification engine 202, the control engine 206, and the classifier engine 208 of FIG. 2. Thus, although the various engines and modules are shown as separate engines in FIGS. 1-4, in other implementations, the functionality of multiple engines and/or modules may be implemented as a single engine and/or module or divided in a variety of engines and/or modules. In some examples, functionalities described herein in relation to any of FIGS. 1-4 may be provided in combination with functionalities described herein in relation to any of FIGS. 5-8.

Figure 5:
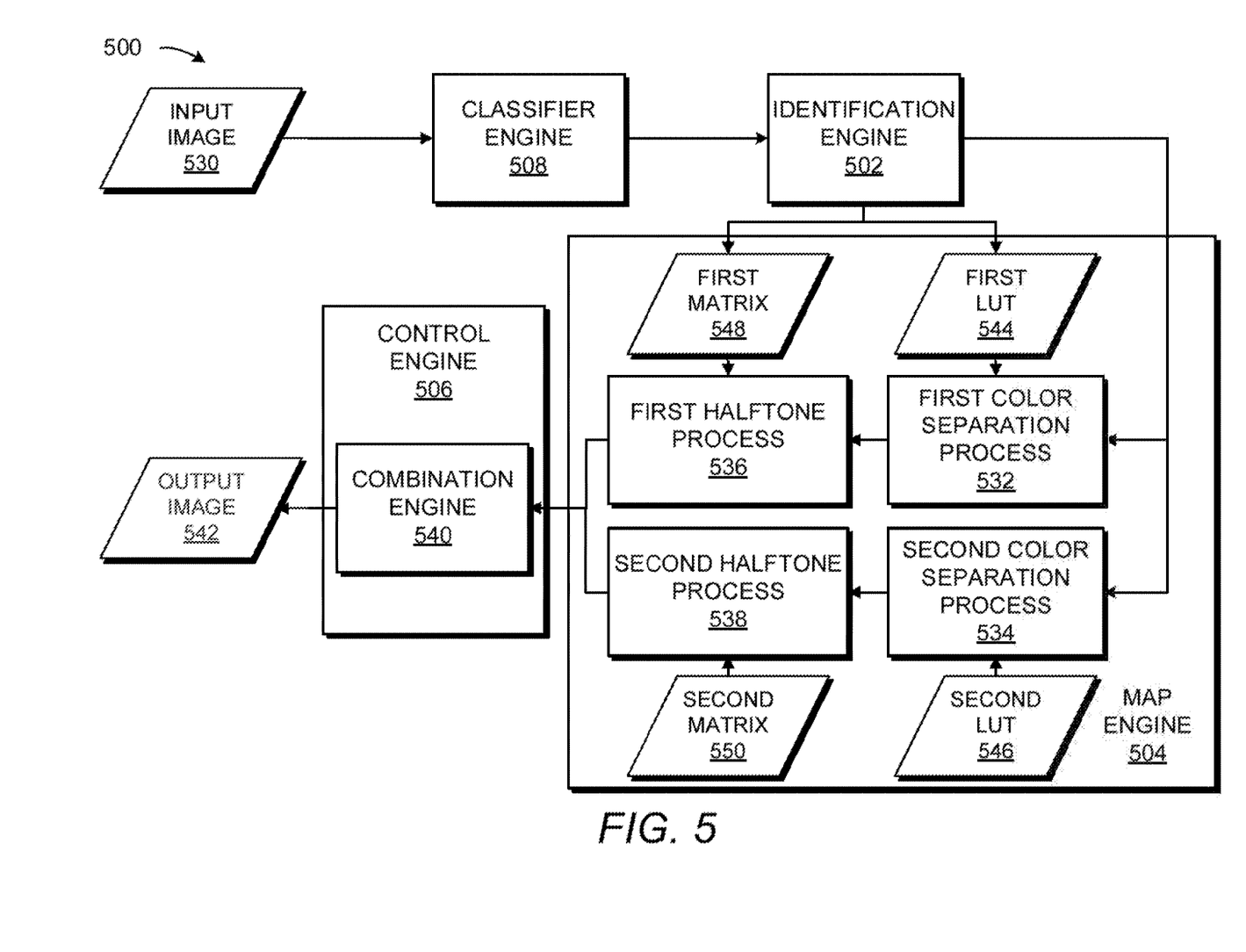
FIG. 5 depicts example engines and example operations of an example image processing system.

FIG. 5 depicts example engines and example operations of an example image processing system 500. Referring to FIG. 5, the example engines of FIG. 5 generally include a classifier engine 508, an identification engine 502, a map engine 504, and a control engine 506 that are similar to the classifier engine 208, the identification engine 202, the map engine 204, and the control engine 206 of FIG. 2, respectively. The associated descriptions have not been repeated in their entirety for brevity. The example engines of FIG. 5 may be implemented on a compute device, such as large format print apparatus.

As depicted in FIG. 5, the classifier engine 508 may receive the input image 530 and perform a classification analysis on the input image 530. The classifier engine 508 associates regions of the input image 530 with classification identifiers. The classifier engine 508 may pass the regional classification associations to the identification engine 502.

The identification engine 502 uses the regional classification information to identify a color mapping resource for a region of the input image 530. In the example of FIG. 5, the identification engine 502 identifies a first LUT 544 (e.g., to use with the first color separation process 532 of a first region of the input image) and a first halftone matrix 548 (e.g., to use in the first halftone process 536 of the result of the first color separation process 532). The identification engine 502 may identify resources for each region (e.g., a second LUT 546 and a second halftone matrix 550) and/or a default set of resources may be used for other regions of the input image 530. The halftone process and/or color separation process may also be considered a resource that may be selected by the identification engine 502 for use with the map engine 504.

The result of the first halftone process 536 (and any other halftone processes, such as second halftone process 538) may be received by the control engine 506 to produce control data useable to produce an output image 542, such control data useable to instruct a printing apparatus. The control engine 506 may include a combination engine 540 which represents circuitry or a combination of circuitry and executable instructions to combine the results of the halftone processes (e.g., output halftone images of the first halftone process 536 and second halftone process 538) into data useable to generate image control data, such as an output halftone image of the input image as processed by color mapping operations.

Although FIG. 5 conceptually depicts two different pipelines, the image processing system may be implemented as multiple pipelines or implemented as a single pipeline with a larger set of NPs. For further example, interpolation may be performed as with a single LUT, while in the matrix halftoning process, the tiles and text flag attached to each pixel may determine if the matrix value is compared against the first or the second set of NPs. In that example, the logic block in an FPGA may be, for example, more compact and smaller by transferring a large table instead of multiple small tables.

Figure 6:
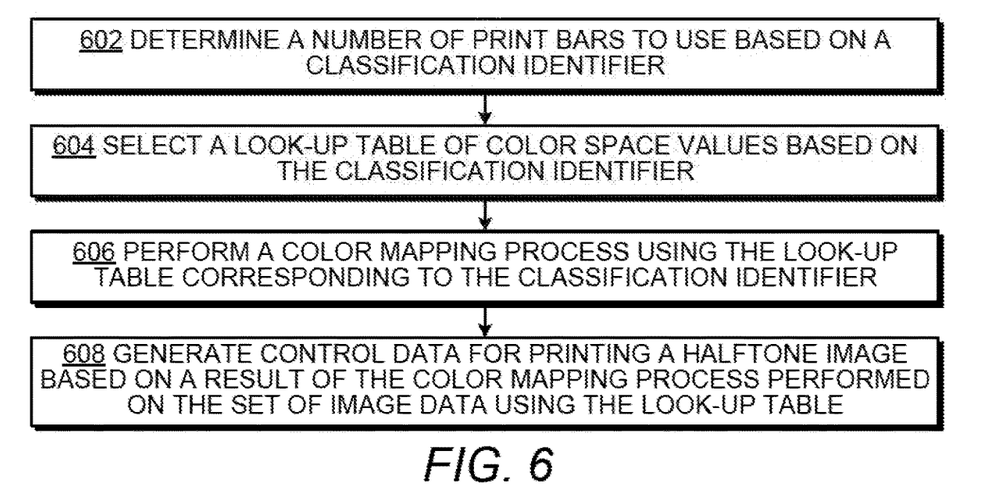
FIGS. 6-8 are flow diagrams depicting example methods of color mapping for use with a printing system.
Figure 7:
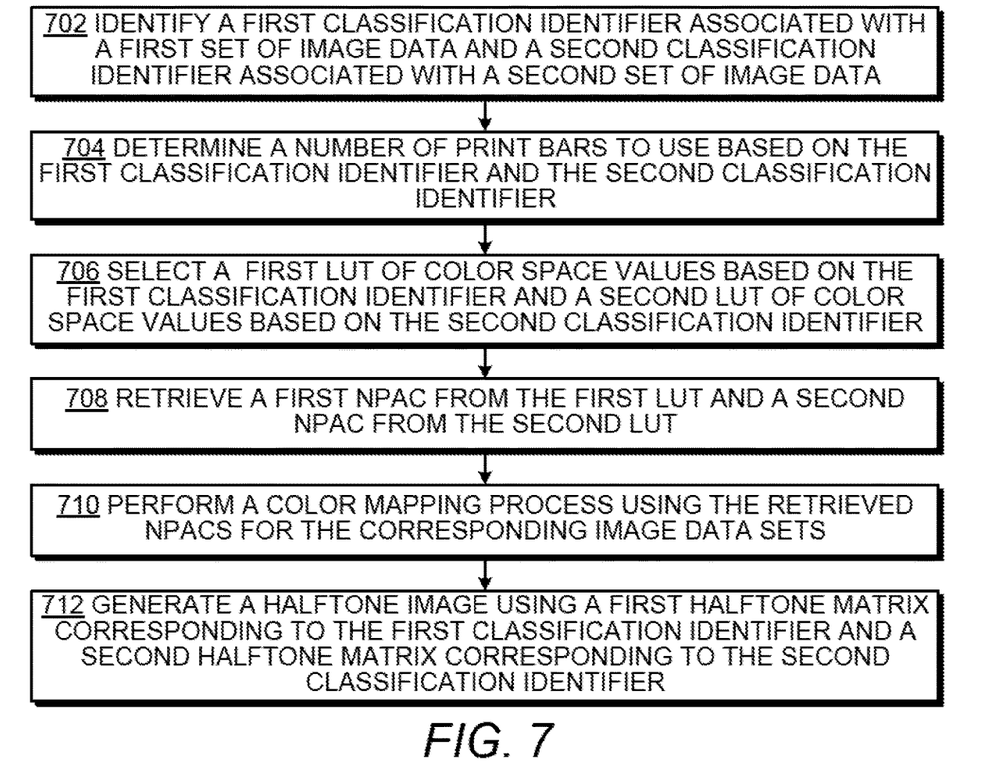
Figure 8:
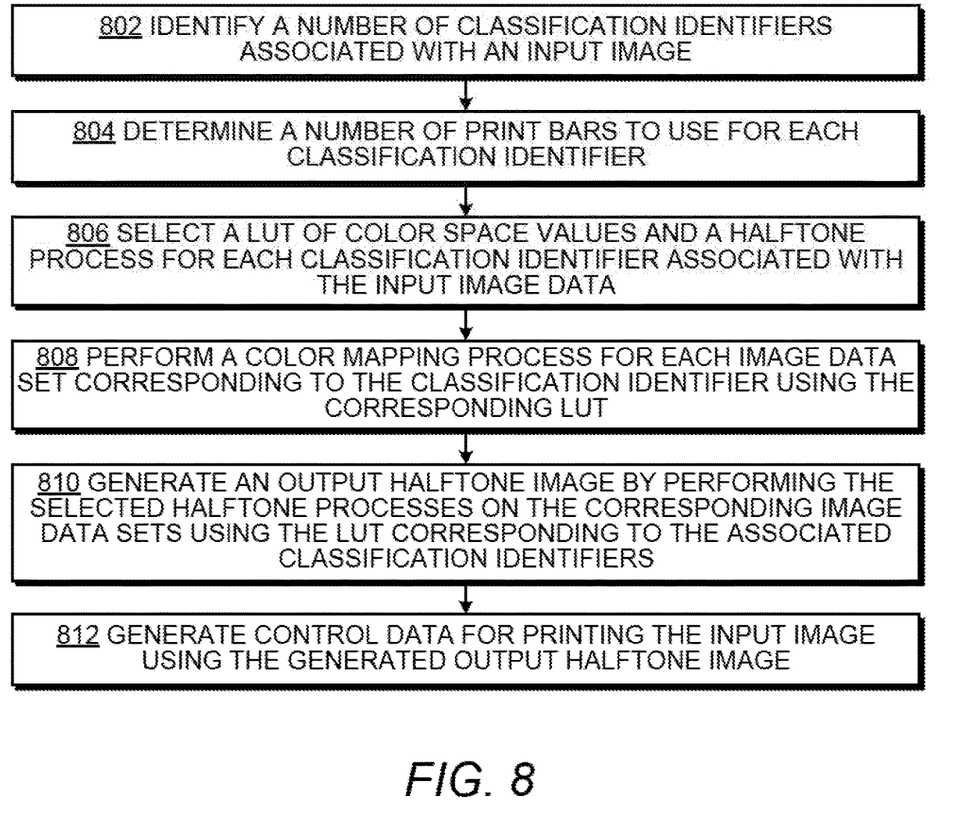

FIGS. 6-8 are flow diagrams depicting example methods of color mapping for use with a print apparatus, such as a print apparatus with multiple print bars. Referring to FIG. 6, example methods of color mapping may generally comprise determining to use a number of print bars, selecting a LUT of color space values based on a classification identifier, performing a color mapping process using the selected LUT, and generating control data for printing based on a result of the color mapping process. The operations discussion herein with reference to FIGS. 6-8 may be performable by the engines and systems of FIGS. 1-5, as appropriate.

At block 602, a number of print bars to use is determined based on a classification identifier. For example, a number of print bars to use for printing a first set of image data (e.g., representing a first region of the image) is determined based on a first classification identifier corresponding with the first set of image data. For example, a single print bar may be selected for use for printing details, such as lines, while a plurality of print bars may be used to print large color fill areas. The operations of block 602 may be performed by an identification engine, such as the identification engine 102 of FIG. 1.

At block 604, a LUT of colors space values is selected based on the first classification identifier. For example, a first LUT of color space values is selected based on a first classification identifier and the first LUT has color space values with coverage sizes that are different than default color space values corresponding to unclassified image data. The operations of block 604 may be performed by an identification engine, such as the identification engine 102 of FIG. 1.

At block 606, a color mapping process is performed using the LUT corresponding to the classification identifier as identified at block 604. For example, the color mapping process for a first set of image data is performed using a first LUT selected at block 604 corresponding to the first classification identifier. The operations of block 606 may be performed by a map engine, such as the map engine 104 of FIG. 1.

At block 608, control data is generated for printing a halftone image based on a result of the color mapping process performed on the first set of image data at block 606 using the LUT identified at block 604. For example, control data for printing a halftone image is generated based on a result of the color mapping process performed at block 606 using the first LUT corresponding to the first classification identifier identified at block 604. The operations of block 608 may be performed by a control, engine, such as the control engine 106 of FIG. 1.

FIGS. 7 and 8 include blocks similar to blocks of FIG. 6 and provide additional blocks and details. In particular, FIG. 7 depicts additional blocks and details generally regarding classifying the image data, retrieving NPACs, and generating a halftone image, and FIG. 8 depicts additional blocks and details generally regarding identifying a number classification identifiers, selecting halftone processes with the classification identifiers, and using the halftone processes to generate an output halftone image. The blocks of FIGS. 7 and 8 include blocks similar to blocks of FIG. 6 and, for brevity, the descriptions of FIG. 6 are not repeated in their entirety for the descriptions of FIGS. 7 and 8.

At block 702, classification identifiers associated with an image are identified. For example, a first classification identifier associated with a first set of image data (e.g., a first region of the image) and a second classification identifier associated with a second set of image data (e.g., a second region of the image) are identified based on characteristics of the color data of those sets of data. The classification identifiers may be identified by a classifier engine, such as classifier engine 208 of FIG. 2.

At block 704, a number of print bars to use for each set of image data is identified based on the first classification identifier and the second classification identifier. At block 706, a first LUT and second LUT of color space values are selected based on the first and second classification identifiers, respectively, at block 702. The LUTs selected at block 706 are used to retrieve a first NPAC from the first LUT and a second NPAC from the second LUT at block 708. At block 710, the color mapping process is performed using the NPACs retrieved at block 708 for the corresponding image data sets. A halftone image is generated at block 712 using a first halftone matrix corresponding to the first classification identifier and a second halftone matric corresponding to the second classification identifier. The first LUT includes NPACs with a number of NPs per NPAC that is different from a number of NPs per NPAC of the second LUT (and the NPs may have rescaled area coverages corresponding to the difference in area coverage of the NPs in corresponding LUT entries). For example, the first LUT may include NPACs with fewer NPs per NPAC than the number of NPs per NPAC of the second LUT to reduce the number of colors for use with details (and increase the coverage size of the remaining NPs proportionally). For another example, the first LUT may include NPACs with more NPs per NPAC than the number of NPs per NPAC of the second LUT to add noise for area fill integrity of non-detail regions (and decrease the coverage size of the original NPs proportionally to accommodate the additional NPs).

Referring to FIG. 8, a number of classification identifiers are identified as associated with an input image at block 802. For example, a classification identifier may be determined for each type of feature identifiable in a feature map derived from a classifier engine, such as classifier engine 208. At block 804, a number of print bars to use is identified for each classification identifier. In this manner, a number of print bars may be associated with each region of the image.

At block 806, a LUT of colors space values and a halftone process are selected for each classification identifier associated with the input image data. For example, a bundle of resources including an LUT, a halftone matrix, and a halftone processing operation are selected based on the classification identifier for the region. At block 808, a color mapping process is performed for each image data set corresponding to the classification identifier using the selected resources (e.g., using the LUT corresponding to the classification identifier).

At block 810, an output halftone image is generated by performing the selected halftone processes on the corresponding image data sets using the LUT corresponding to the associated classification identifiers. For example, the result of a color separation process using the LUTs for an image region corresponding to a particular image classification is processed with a halftone process corresponding to the image classification using a halftone matrix corresponding to the image classification. Separate halftone process results may be combined or the halftone process may utilize the multiple regions and halftone resources as inputs to produce an output halftone image. The halftone processing results are used to generate an output halftone image and the output halftone image is used at block 812 to generate control data for printing the input image by a print apparatus. By providing modified resources, custom features in an image may be, for example, processed differently than general regions of an image and the images may be, for example, processed in a homogenous way with content-type color mapping accommodations.

Although the flow diagrams of FIGS. 5-8 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. An image processing system comprising:
a memory storing instructions; and
a processor, by executing the instructions stored in the memory, to:
identify a color mapping resource in response to a classification identifier corresponding to image data;
identify a coverage attribute threshold corresponding to the classification identifier that is different from a default coverage attribute threshold;
select a look-up table (LUT) corresponding to the identified coverage attribute threshold that is different from the default coverage attribute threshold;
map the image data with the color mapping resource having color space values corresponding to the classification identifier; and
generate control data for operating a print apparatus to print based on the color mapping resource.

2. The system of claim 1, further comprising:
a print fluid ejection system to deposit colorants according to the control data,
wherein the processor, by further executing the instructions stored in the memory, is to determine the classification identifier based on a characteristic of the image data.

3. The system of claim 1, wherein the classification identifier corresponds to a region of the image data.

4. The system of claim 3, wherein the region of the image data includes an edge or a line.

5. An image processing system comprising:
a memory storing instructions; and
a processor, by executing the instructions stored in the memory, to:
identify a color mapping resource in response to a classification identifier corresponding to image data;

retrieve a general look-up table (LUT);
compute a modified version of the general LUT based on an identified coverage attribute threshold;
map the image data with the color mapping resource having color space values corresponding to the classification identifier; and
generate control data for operating a print apparatus to print based on the color mapping resource.

6. The system of claim 5, further comprising:
a print fluid ejection system to deposit colorants according to the control data,
wherein the processor, by further executing the instructions stored in the memory, is to determine the classification identifier based on a characteristic of the image data.

7. An image processing system comprising:
a memory storing instructions; and
a processor, by executing the instructions stored in the memory, to:
identify a color mapping resource in response to a classification identifier corresponding to image data;
map the image data with the color mapping resource having color space values corresponding to the classification identifier; and
generate control data for operating a print apparatus to print based on the color mapping resource by combining a first set of halftone image data processed using a first look-up table (LUT) with image data corresponding to a first coverage attribute threshold and a second set of halftone image data processed using a second LUT corresponding to a second coverage attribute threshold that is different from the first coverage attribute threshold.

8. The system of claim 7, further comprising:
a print fluid ejection system to deposit colorants according to the control data,
wherein the processor, by further executing the instructions stored in the memory, is to determine the classification identifier based on a characteristic of the image data.

9. A non-transitory computer-readable storage medium comprising a set of instructions executable by a processor resource to:
perform a color mapping process using color space values derived from a modified color space based on a classification identifier corresponding to input image data,
wherein the modified color space includes color area coverages that are:
increased when the classification identifier corresponds to a detail feature; or
decreased when the classification identifier corresponds to a non-detail feature.

10. The medium of claim 9, wherein the color space values are Neugebauer Primaries (NPs) and the color area coverages are Neugebauer Primary Area Coverages (NPACs).

11. The medium of claim 10, wherein the set of instructions is executable by the processor resource to:
modify a look-up table (LUT) of color space values to include the modified color space values by:
removing coverages in order of coverage size until a threshold number of NPs is achieved and rescaling any remaining coverage areas; or
adding noise to the color space values above a coverage attribute threshold and rescaling any remaining coverage areas.

12. The medium of claim 10, wherein the set of instructions is executable by the processor resource to:
remove NPs from an NPAC retrieved from a LUT by:
omission of NPs with a color area coverage less than a coverage size threshold or
elimination of NPs with a relatively smallest area coverage until a coverage complexity threshold is achieved;
maintain a coverage size of a blank NP with respect to unmodified color space values; and
rescale coverages of non-blank NPs to increase coverage in response to the removal of NPs.

13. The medium of claim 10, wherein the set of instructions is executable by the processor resource to:
select a halftone resource based on the classification identifier;
produce an output image halftone using the selected halftone resource; and
generate control data for a print apparatus from the output image halftone.

14. The medium of claim 9, wherein the classification identifier corresponds to a region of the image data.

15. The medium of claim 14, wherein the region of the image data includes an edge or a line.

16. A method of color mapping for use with a print apparatus having multiple print bars comprising:
determining to use a number of print bars based on a first classification identifier corresponding with a first set of image data;
selecting a first look-up table (LUT) of color space values based on the first classification identifier, the first LUT having color space values with coverage sizes that are different than default color space values corresponding to unclassified image data;
performing a color mapping process for the first set of image data using the first LUT corresponding to the first classification identifier; and
generating control data for printing a halftone image based on a result of the color mapping process performed on the first set of image data using the first LUT corresponding to the first classification identifier.

17. The method of claim 16, comprising:
retrieving a first Neugebauer Primary Area Coverage (NPAC) from the first LUT to use with the color mapping process of the first set of image data;
selecting a second LUT of color space values based on a second classification identifier corresponding to a second set of image data;
retrieving a second NPAC from the second LUT to use with the color mapping process of the second set of image data corresponding to the second classification identifier; and
generating a halftone image of the first set of image data and the second set of image data using the first NP for image data corresponding to the first classification identifier and using the second NP for image data corresponding to the second classification identifier.

18. The method of claim 17, wherein:
the first LUT includes NPACs with a number of Neugebauer Primaries (NPs) per NPAC that is different from a number of NPs per NPAC of the second LUT; and
the first LUT includes rescaled area coverages corresponding to a difference in area coverage of the NPs in corresponding LUT entries.

19. The method of claim 16, wherein generating control data comprises:

selecting a halftone process for the first set of image data based on the first classification identifier; and generating an output halftone image by performing the selected halftone process on the first set of image data using the first LUT corresponding to the classification identifier.

20. The method of claim 16, comprising:

selecting a LUT for each classification identifier associated with input image data, the input image data comprising the first set of image data corresponding to the first classification identifier and a second set of image data corresponding to a second classification identifier; and performing the color mapping process for each pixel of the input image data using a resource set corresponding to the classification identifier associated with the respective pixel, the resource set comprising a LUT and a halftone matrix.

21. The method of claim 16, wherein the first classification identifier corresponds to a region of the image data.

* * * * *